J. W. GRIM.
AUTOMOBILE CURTAIN.
APPLICATION FILED MAR. 22, 1915.
1,256,013.
Patented Feb. 12, 1918.
2 SHEETS—SHEET 2.
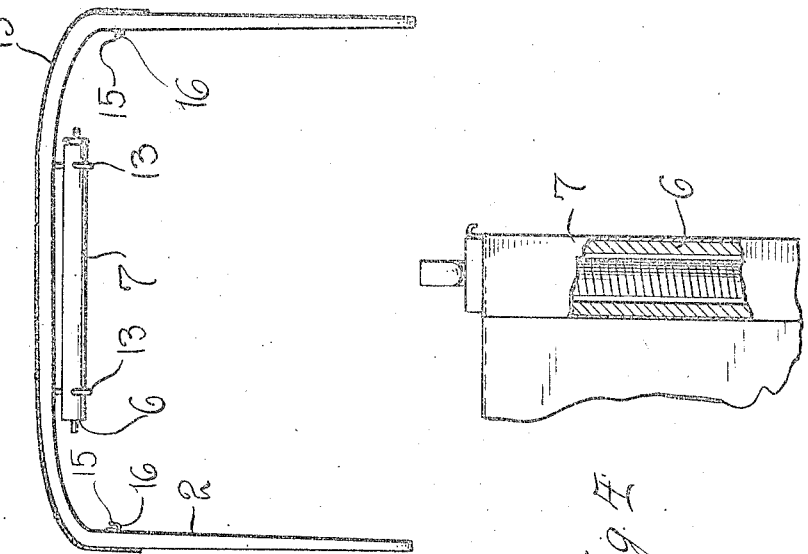
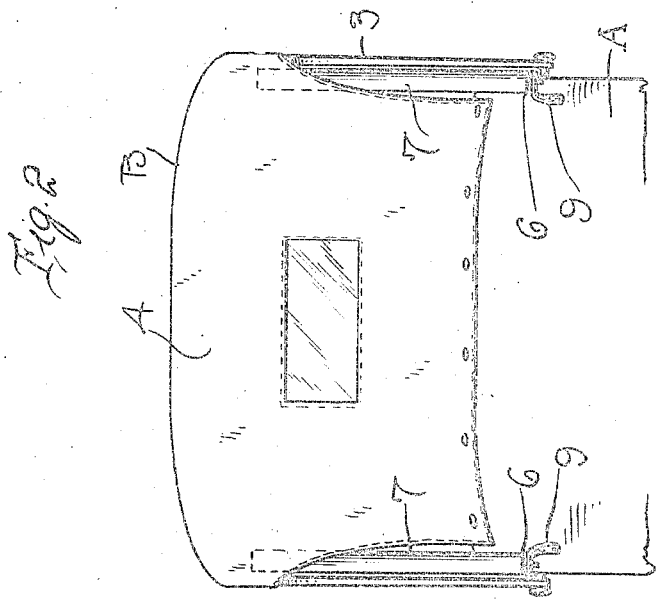
Inventor
J. W. Grim

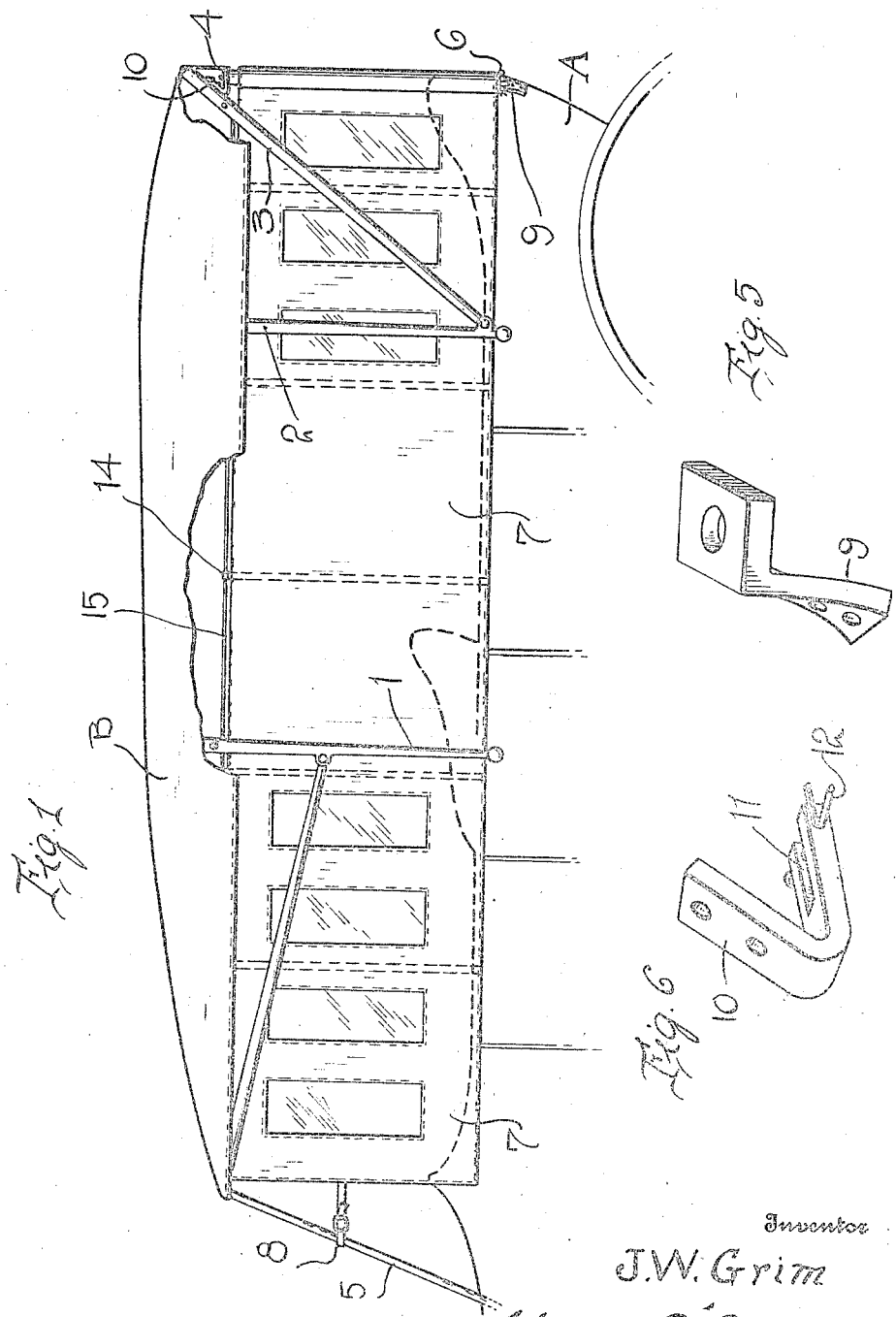

UNITED STATES PATENT OFFICE.

JOHN W. GRIM, OF ABBOTTSTOWN, PENNSYLVANIA.

AUTOMOBILE-CURTAIN.

1,256,013.  Specification of Letters Patent.  Patented Feb. 12, 1918.

Application filed March 22, 1915. Serial No. 16,270.

*To all whom it may concern:*

Be it known that I, JOHN W. GRIM, a citizen of the United States, residing at Abbottstown, in the county of Adams and State of Pennsylvania, have invented certain new and useful Improvements in Automobile-Curtains, of which the following is a specification, reference being had to the accompanying drawings.

My invention relates to automobiles, and particularly to the side curtains thereof. In all automobiles known to me the side curtains have to be attached to the top and to the body of the automobile in order to protect the occupants, or detached therefrom and placed beneath the seat cushions when it is desired to remove the curtains.

The primary object of my invention is to provide means for mounting the side curtains in such fashion that one continuous curtain may be used for each side of the machine, these curtains being mounted upon spring rollers so that the curtains may be successively drawn out to inclose the space rearward of the rear bow, the space rearward of the forward bow, and the space forward of the driver's seat, or first bow.

A further object of my invention is to so mount the spring rollers of these curtains that the top may be folded up or closed.

Other objects will appear in the course of the following description.

My invention is illustrated in the accompanying drawings, in which:

Figure 1 is a side elevation, partly broken away, of an automobile showing my curtains applied thereto;

Fig. 2 is a rear end view of the automobile with the side curtains in place thereon;

Fig. 3 is a cross sectional view showing the rear bow and means for supporting the curtains;

Fig. 4 is a detailed fragmentary view of the curtain roller and the curtain;

Fig. 5 is a perspective view of the lowermost supporting bracket;

Figure 6 is a detailed perspective view of the uppermost supporting bracket.

Referring to these figures, A designates an automobile body of any suitable construction, and B the top thereof which is also of ordinary construction. 1 designates the forward bow and 2 the intermediate bow and 3 the rear bow, all of the usual construction, and 4 designates the rear curtain. The forward end of the top is braced against wind strain by the usual straps 5.

Mounted at the rear end of the body and extending vertically upward at each end of the rear curtain and approximately filling the space between the side walls of the body and the top are spring rollers 6 carrying thereon the curtains 7. Each of these curtains has a length at least equal to the length of the top B. Each of these curtains is provided at its free end with a hook or strap 8 whereby the free end of the curtain may be engaged with one or the other of the bows 1 and 2 or with the brace strap 5. It is to be understoood of course that the usual rule joint braces may be used for bracing the several bows and the top, and that the bows and top may be constructed in any desired manner.

Each of the spring rollers 6 is mounted at its lower end in a bracket 9 attached in any suitable manner to the body of the automobile, this bracket being formed with an opening for the reception of the usual gudgeon of the spring roller. The upper end of each of the spring rollers 6 is supported by a bracket 10, this bracket, as illustrated in Fig. 6 being formed with a slot 11 for the reception of the rectangular gudgeon at the upper end of the spring roller, this gudgeon being held in place within the slot 11 by means of the transversely extending cotter pin 12, or by like means, this pin being removable to permit the removal of the spring roller from the bracket.

A plurality of hooks, straps, or other supporting devices, designated 13, are attached to the bows where they cross the body of the automobile, and the spring rollers 6 with their curtains 7 wrapped thereon may be readily removed from the brackets 9 and 10 and supported in these straps, hooks, or other supporting devices, to permit the top to be folded back or crushed.

While I do not wish to limit myself to any particular manner for engaging the curtain with the top, I preferably provide a plurality of upwardly extending metallic strips disposed between the plies of the curtain and projecting above the upper edge thereof and there formed into hooks 14. Also attached to the top of the automobile and extending therealong adjacent each side edge is a cable 15, which, being flexible, is adapted to be folded up when the top is folded, and which is drawn out when the top is expanded. The hooks 14 are adapted to engage this cable. The cable is preferably supported by means of brackets 16 mounted upon the bows, the brackets being so formed as to engage the curtain hooks and be disengaged therefrom to permit the hooks to pass over the brackets, as shown in Fig. 3.

While I have illustrated a specific construction for preventing the curtain from sagging, which it otherwise would do under the weight of the curtain, it is obvious that other means than that shown might be provided for this purpose.

The operation of my invention will be obvious from the drawing. When it is desired that the body of the automobile shall be entirely open, the curtains are left rolled up. If it be desired to close the rear portion of the automobile rearward of the rear bow 3, one or the other of the curtains are drawn forward until the members 8 engage with the bow 2. If it is desired to close not only the rear portion of the automobile but all that portion rearward of the driver's seat, the curtains are drawn forward and the catches engaged with the forward bow. If it is desired to protect the driver as well as the passengers, the curtains are drawn forward so that the straps 8 engage with the brace straps 5. It will be obvious that the curtains may be readily disengaged and that as soon as disengaged from the bows or from the brace straps the springs within the curtain rollers will cause the rollers to retract the curtains.

When it is desired to fold back the top, the spring rollers are removed from engagement with the brackets 9 and 10 and supported parallel to the transversely extending portion of the bows, and the rear bow and the following bows may thus be readily folded back in the usual manner of automobile tops.

While I have illustrated certain details of construction, I do not wish to be limited thereto as it is obvious that minor changes might be made without departing from the spirit of the invention.

It will be obvious that the curtains can be disposed either on the outside of the bows or on the inside, as may be desired.

Having thus described my invention, what I claim is:

The combination with a vehicle having a body and a top, side curtains therefor, vertically disposed spring rollers upon which the side curtains are mounted, flexible elements extending longitudinally along the top at each side margin thereof, and supporting members extending at intervals vertically across each curtain and parallel to the spring roller thereof, said supporting members at their upper end being hooked to engage over said elements.

In testimony whereof I hereunto affix my signature in the presence of two witnesses.

JOHN W. GRIM.

Witnesses:
JULIUS W. FISCHER,
PAUL E. LAU.